United States Patent [19]

Smith

[11] Patent Number: 5,402,293
[45] Date of Patent: Mar. 28, 1995

[54] MAGNETO-OPTICAL HEAD HAVING A THIN FILM COIL RECESSED INTO A MAGNETIC SUBSTRATE

[75] Inventor: Christopher Smith, Boulder, Colo.

[73] Assignee: Sony Electronics Inc., Park Ridge, N.J.

[21] Appl. No.: 634,484

[22] Filed: Dec. 27, 1990

[51] Int. Cl.$^6$ .................................. G11B 13/04
[52] U.S. Cl. .......................... 360/114; 360/59; 360/66; 360/60; 369/13
[58] Field of Search ................ 369/13; 360/59, 114, 360/66, 60, 122

[56] References Cited

U.S. PATENT DOCUMENTS

| | | | |
|---|---|---|---|
| 4,652,954 | 3/1987 | Church | 360/120 |
| 4,807,210 | 2/1989 | Kaku et al. | 369/13 |
| 5,065,270 | 11/1991 | Koyanagi et al. | 360/123 |
| 5,124,870 | 6/1992 | Toyoda | 360/126 |
| 5,140,568 | 8/1992 | Yoda | 360/114 |
| 5,170,302 | 12/1992 | Matsumoto | 360/123 |

FOREIGN PATENT DOCUMENTS

| | | | |
|---|---|---|---|
| 0291248 | 11/1988 | European Pat. Off. | |
| 63-55704 | 3/1988 | Japan | 360/114 |
| 63-249905 | 10/1988 | Japan | 369/13 |
| 4-010202 | 1/1992 | Japan | 369/13 |

OTHER PUBLICATIONS

Patent Abstracts of Japan, vol. 14, No. 402 (P-1099)(4345), 30 Aug. 1990 & JP-A-21 54 348 (Nippon Telegram & Telegraph Corp.), 13 Jun. 1990.
Patent Abstracts of Japan, vol. 15, No. 75 (P-1169), 21 Feb. 1991 & JP-A-22 94 903 (Mitsubishi Electric Corp.), 5 Dec. 1990.
Patent Abstracts of Japan, vol. 13, No. 389 (P-925), 29 Aug. 1989 & JP-A-11 37 419 (Fuji Photo Film Co. Ltd.), 30 May 1989.
Patent Abstracts of Japan, vol. 13, No. 85 (P-834), 27 Feb. 1989 & JP-A-63 268 110 (Matsushita Electric Ind. Co. Ltd.), 4 Nov. 1988.
Research Disclosure, No. 323, Mar. 1991, RD32378, Emsworth, GBr; ANON.: "Low Radiation Head Design for Magneto-Optic Direct Overwrite."
Patent Abstracts of Japan, vol. 10, No. 76, (P-440)(2133), 26 Mar. 1986 & JP-A-60 214 438 (Suwa Seikosha K.K.).
Patent Abstracts of Japan, vol. 13, No. 9 (P-811)(3357), 11 Jan. 1989 & JP-A-63 217 547 (Fujitsu Ltd.).
Patent Abstracts of Japan, vol. 9, No. 156 (P-368)(1879), 29 Jun. 1985 & JP-A-60 29 904 (Seiko Denshi Kogyo K.K.).
Patent Abstracts of Japan, vol. 14, No. 409 (p-1101)(4352), 5 Sep. 1990 & JP-A-02 158 942 (Fuji Electric Co. Ltd.).
Japanese Journal of Applied Physics, vol. 28 (1989), supplement 28-3, pp. 329-333; G. Fujita et al.: "A Magneto-Optical Recording Method of Magnetic Field Modulation with Pulsed Laser Irradiation."
Japanese Utility Model Application No. 01-136416, "Overwrite Magnetic Head for Magneto-optical Recording."
Proceedings of the Optical Memory Symposium, Tokyo, Japan, 1988; T. Watanabe et al.: "High Speed Overwriting Method for Magneto-optical Recording."
Topical Meeting on Optical Data Storage, Mar. 5–7, 1990, Vancouver, Canada, pp. 151-154; F. Tanaka et al.: "Advanced Magneto-Optical Disk Drive and Media," *Conference Digest*.
Topical Meeting on Optical Data Storage, Mar. 5-7, 1990, Vancouver, Canada, pp. 160-162; H. Izumi et al.: "Overwrite Characteristics of Magneto-Opitcal Discs by Magnetic Field Modulation," *Conference Digest*.

(List continued on next page.)

*Primary Examiner*—Hoa T. Nguyen
*Attorney, Agent, or Firm*—Limbach & Limbach

[57] ABSTRACT

A magneto-optical head formed of a magnetically permeable substrate in which an annular recess is formed in a planar surface of the substrate and a plurality of thin film windings are deposited in the recess to make up the coil windings of the head.

14 Claims, 5 Drawing Sheets

OTHER PUBLICATIONS

Topical Meeting on Optical Data Storage, Mar. 5—7, 1990, Vancouver, Canada, pp. 168–171 plus 7 additional unnumbered pages; T. Yamagami et al.: "High Density Magneto-Optical Recording with Magnetic Field Modulation and Pulsed Laser Irradiation," Conference Digest.

Topical Meeting on Optical Data Storage, Mar. 5–7, 1990, Vancouver, Canada, pp. 176–179; S. Sujaya et al.: "Magnetic Field Modulation Overwrite Characteristics for Magneto-Optical Disks Using an Active Head-to-Disk Spacing Control Method," Conference Digest.

Journal of Applied Physics, vol. 63(8), 15 Apr. 1988, pp. 3847–3849.

MAGNETO-OPTICAL HEAD HAVING A THIN FILM COIL RECESSED INTO A MAGNETIC SUBSTRATE

FIELD OF THE INVENTION

The present invention broadly relates to magnetic recording heads for use in magneto-optic disk drives, and more particularly to an improved thin film magnetic recording head.

BACKGROUND ART

Magneto-optic (MO) disk drives are now being used as rewritable, high capacity storage devices. Such drives utilize the fact that a laser beam reflected by a magnetic layer is deflected in one of two opposite directions depending upon the polarity of the layer at the point of reflection. Information is written onto such a layer by heating a portion of the layer, which corresponds to one bit of information, beyond the Curie point of the layer material and then allowing the material to cool under the influence of a magnetic field, so that the desired portion of the layer assumes the orientation of the magnetic field. One polarity corresponds to "0" and the opposite polarity corresponds to "1," so that information is written in binary code. The typical magnetic layer is a Tb—Fe—Co amorphous film.

However, one great disadvantage of conventional MO disk drives is the inability to directly overwrite existing information, which results in slower write times. This problem is largely due to the fact that the magnetic field is typically applied by a square bar magnet polarized in a direction perpendicular to its axis. To reverse the polarity, the magnet must be rotated 180 degrees; this typically takes approximately 12 milliseconds. While laser pulse frequencies of 5 Mhz are not uncommon, the time required to rotate the magnet places a limit on writing speed that is too slow for practical direct overwriting.

Thus, overwriting is now normally done by first erasing an entire track by heating it and allowing it to cool under a magnetic field which polarizes all of the bits in one direction, and then rotating the magnet and pulsing the laser to heat only those bits which should be of the opposite polarity.

For this reason, a fast switching rate of the magnetic field is required for direct overwriting. One such proposal is described by Yamagami et al., in "High Density Magneto-Optical Recording with Magnetic Field Modulation and Pulsed Laser Irradiation," *Conference Digest, Topical Meeting on Optical Data Storage*, 1990, pp 168–171.

In this article, the authors describe the use of a thin film magnetic head for direct overwriting. The head is formed by applying a thin film layer on a Ni–Zn ferrite board. Such a head is also described in an article by Watanabe et al., in *Proc. Optical Memory Symposium, Tokyo*, 24988, p. 47.

The wavelength of the laser used by Yamagami et al., was 750 nm and the N.A. of the objective lens was 0.53. This results in a spot approximately 1 micron in diameter. As lasers with shorter wavelengths become available, this spot size will decrease.

Figure 1:
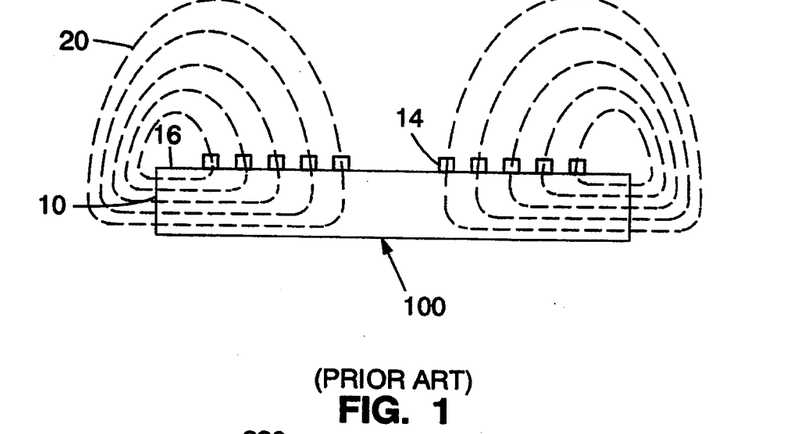
FIG. 1 is a cross sectional view of a prior art, thin film dual coil magnetic head for overwriting an MO disc.

As noted by Yamagami et al., a magnetic head for direct overwriting must have a uniform resistance up to 20 MHz and a wide range of magnetic field intensity as much as ±150 Oe, which is about the minimum field strength which can alter a recording layer of present technology. FIG. 1 illustrates a thin film magnetooptic recording head 100. The thin film magnetic head 100 is comprised of a Ni—Zn ferrite substrate 10 and a continuous coil 14 of conductive material having a plurality of windings. The coil 14 is positioned on the top, planar surface 16 of the substrate 10 as viewed in the figure, and is formed by thin film techniques, for example by depositing a layer of conductive material on the planar surface 16 and, using conventional photolithographic techniques, etching the continuous coil pattern.

A current is supplied to the coil 14 and creates a magnetic field 20 which is perpendicular to the substrate surface and the current path through the coil 14. The current through the coil 14 is electrically switched to quickly alternate the direction of the magnetic field. Hence, the head can be used for direct overwriting at a more rapid rate than that which is attainable by MO drives using bar magnets. Yamagami et al. reported a burst transfer rate of 15 Mps.

However, while the magnetic thin film head is an improvement, it also has several disadvantages. First, the head must be maintained relatively close to the MO disk. The bar magnets described above are much stronger and are normally located about 0.5 mm away from the disk. Even at this distance, the magnetic field is about 250 Oe, sufficient to allow for the normal up and down wobble of the disk, which can be as much as 0.3 mm. The thin film head of Yamagami et al., on the other hand, generates a field of 150 Oe at a distance of 0.1 mm, or 100 microns. This is in part due to the fact that the head suffers from flux leakage. Thus, the magnetic head must remain within 0.1 mm of the recording layer so that the field strength at the disk is sufficient for writing. To accomplish this, the head must move with the disk. Further, such close proximity creates a danger of contact between the head to the disk.

Another disadvantage of the thin film coil head described by Yamagami et al. is that its impedance causes its alternating current resistance to increase rapidly as the frequency of the current exceeds 20 Mhz. This imposes another limit on the speed of overwriting which is attainable with such a thin film head.

Still another disadvantage of the thin film head described by Yamagami et al. is that current flows through the coil continuously, and this causes the head to get very hot, which shortens the useful life of the head.

An improvement to the the thin film head of Yamagami et al. is shown in Japanese Utility Model Application No. 01-136416, which teaches the use of two elongate coils, one superimposed on the other, in which the windings of one coil run in the clockwise direction and those in the other coil run in the counterclockwise direction. This structure, while solving suffers from flux leakage and heat dissipation some of the problems of the single coil head, still problems.

It is therefore an object of the present invention to provide a magneto-optical recording head which provides increased disk to head spacing and thus minimizes the risk of contact between the head and the disk.

Another object of the present invention is to provide a magneto-optical recording head having means which minimizes magnetic flux leakage at the head, thereby using less current to establish a magnetic field, or, alternatively, generating a greater field at a given level of current.

A further object of the invention is to provide a magneto-optical recording head which allows more rapid switching of the magnetic field so as to achieve a fast data recording rate.

Another object of the invention is to provide a magneto-optical recording head with an improved heat dissipating capability.

SUMMARY OF THE INVENTION

The foregoing and other objects of the invention are achieved by a thin film magnetic head, utilizable for optically recording data on a magneto-optical recording medium, comprising:
- a magnetic substrate having a planar surface and a magnetic pole piece extending upward from the planar surface substantially perpendicular thereto; and
- a plurality of thin film, continuous coils of conductive material, each having a plurality of continuous windings, positioned about the magnetic pole piece, and separated from each other by an insulating material.

In the preferred embodiment of the invention, the substrate has an annularly shaped recess on the planar surface thereof, about the one pole piece and in which the coils are mounted. The coils have a combined thickness which is about equal to the height of the one pole piece and the depth of the annularly shaped recess.

The features and advantages described in the specification are not all inclusive, and additional features and advantages will be apparent to one of ordinary skill in the art in view of the drawings, specification and claims thereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENT

FIGS. 1 through 8j of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 2:
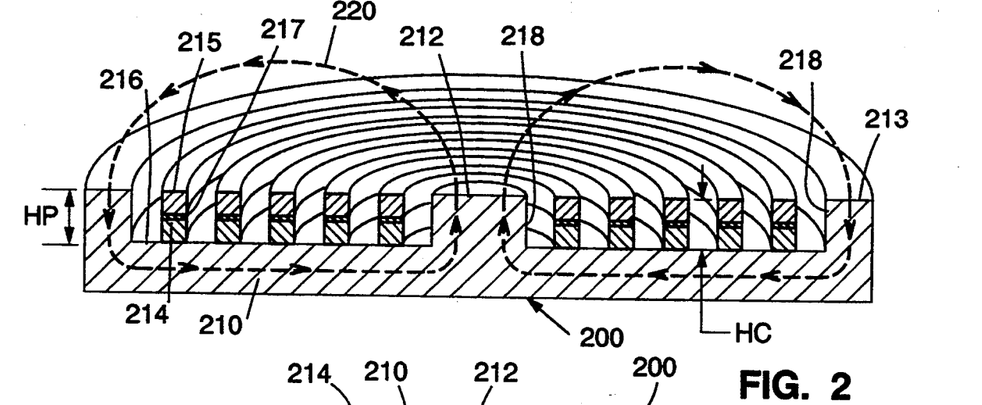
FIG. 2 is a cross sectional view of a thin film dual coil magnetic head of the present invention.

Referring to FIG. 2, a thin-film magnetic center pole head 200, utilizable for overwriting data on a magneto-optic recording medium using a thermomagnetic recording process, is illustrated. The magnetic center pole head 200 is designed for a recording system where the magnetic head and an optical lens for focusing light source are positioned on opposite sides of a recording medium. The center pole head 200 is fabricated using photolithographic thin film techniques. It is similar to the continuous coil thin film head 100 illustrated in FIG. 1 in that it is comprised of a ferrite substrate 210, such as a nickel-zinc ferrite, and a first continuous conductive coil 214 formed using thin film photolithography.

However, the head 200 also includes a recessed region or groove 216 in the substrate 210, and the first coil 214 and a second coil 215, separated from the coil 214 by an insulating layer 217, are located in the recessed region 216. The recessed region 216 forms outer channel walls 218 which extend up vertically to create an outer, annular pole piece 213. In the center of the recessed region 216 is a center pole piece 212 extending perpendicular to the substrate's planar surface. The coils 214 and 215 are positioned about the center pole piece 212 and each have a height equal to one half of the total coil height HC. While the center pole piece 212 and the outer pole piece 213 need not be the same height, in the illustrated embodiment they are equal and of a height HP. Further, the height HP of the pole pieces 212 and 213 is preferably about equal to or greater than the combined height HC of the coils 214 and 215. In the illustrated embodiment, HP is equal to HC.

As with the thin film head 100 illustrated in FIG. 1, the head 200 is on the order of 3 mm thick. Most of the thickness is the substrate; the coils are about 1 micron thick, and can accept a maximum of approximately one half of an ampere of current.

By positioning the coils 214 and 215 about a center pole 212 and surrounded by annular, outer pole 213, each pole having a height about equal to or greater than the combined height HC of coils 214 and 215, the magnetic flux return path is shortened by a distance of 2 HP, i.e. the sum of the height of pole 212 and the height of pole 213, which is equal to or greater than 2 HC. This reduces flux fringing problems and thus a smaller current may be supplied to the coil 214 or 215 to generate a magnetic field 220 having about the same intensity as the magnetic field through a head without an interior pole 212, such as magnetic head 100 illustrated in FIG. 1.

Since the coils 214 and 215 are formed about the center pole 212, the recess region 216 must be large enough to accommodate the coils 214 and 215 and the center pole 212. For purposes of illustration, the spacing between the "windings" of the coils 214 and 215 are greatly exaggerated. In practice, the windings are contiguous.

In the preferred embodiment, the magnetic substrate 210, including the poles 212 and 213 and the channel walls 218, are fabricated out of a magnetic material which is magnetically "soft" (i.e., has low hysteresis giving a low energy loss, low residual magnetic flux density, low coercivity, low remenence), and which has high AC magnetic permeability in the operating range of interest (for example, 1–20 MHz), high saturation magnetic flux density, a high Curie temperature, and a low coefficient of thermal expansion.

The coils 2244 and 215 are formed of a conductive material having high conductivity, low inductance over the range of operation, and low thermal expansion. In the preferred embodiment, the coils are made of copper.

Figure 3:
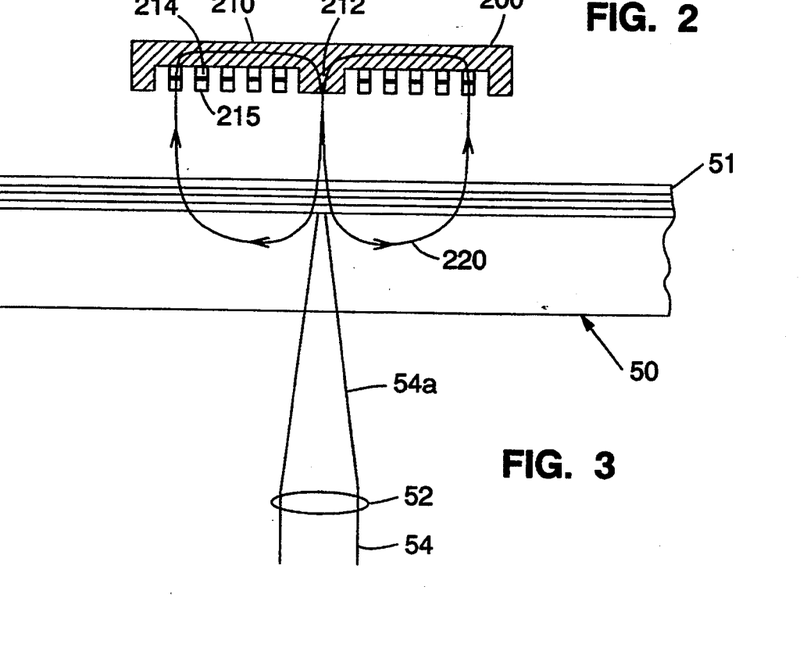
FIG. 3 is a cross-sectional view of the magnetic overwrite head of FIG. 2 employed in a recording system where the head and the laser source are positioned on opposite sides of a recording media.

Referring to FIG. 3, the dual coil magnetic head 200 of FIG. 2 is illustrated in use, with the magnetic head 200 on the opposite side of a recording disk 50 from the source of a laser beam 54 and focussing lens 52. Data is recorded on the recording layer 51 of the recording disk 50 using a thermo-magnetic recording process where heat is supplied to the disk 50 via a focussed laser beam 54a to raise the temperature of the magnetic recording layer 51 to the Curie temperature. A magnetic field 220 from the magnetic head 200 orients the magnetic particles in a recording layer 51 in the same direction as the field orientation of the magnetic field 220. The heated recording layer is then allowed to cool (perhaps under a lower power laser which is used for reading, not writing, and may also be on for tracking purposes) and the magnetic particles in the recording layer 51 retain the orientation of the magnetic field. The disc coercivity (field strength required to change particle orientation) is high at room temperature and approaches zero at the Curie temperature. Hence, the magnetic head 200 and the laser beam 54 are used to orient the data bits to be stored on the disk 50. The laser beam 54 can be either pulsed in conjunction with electrical pulses supplied to the head 200 (pulse irradiation method of recording) or continuous (continuous wave method of recording).

The magnetic field 220 is created by applying a current to one of the coils 214 or 215, depending upon the orientation of the field desired, and in effect by whether it is desired to write a "0" or a "1." The field 220 is substantially perpendicular to the current path through the coil 214 or 215.

In the preferred embodiment, the windings of the coils run in opposite directions, i.e. the windings of one coil run clockwise and the windings of the other coil run counter-clockwise. This insures that the orientation of the field of one coil will be opposite to the orientation of the field of the other coil, and allows both coils to be alternately activated by a single voltage source.

The magnetic field 220 is most intense at the center of the magnetic head 200, and in particular through the center pole. Hence, laser beam 54 is focussed on the disk 50 across from the center pole.

As above, by positioning the coils 214 and 215 about the center pole 212 having a height about equal to or greater than the combined height of coils 214 and 215, the magnetic flux of the magnetic field 220 created travels a shorter path between the poles and therefore is more concentrated at the center of the head 200. Thus, a smaller current can be supplied to the coils 214 or 215 to generate a magnetic field 220 having about the same intensity as a magnetic field through a head without an interior pole 212, such as the prior art magnetic head 100 illustrated in FIG. 1.

Another benefit of the dual coil head 200 is that it creates less heat. The prior art thin film head 100 has a current flowing in one direction or the other, depending upon the desired orientation of the magnetic field, virtually all the time. As a result, the coil gets and stays quite hot, which shortens its useful life. In the present invention, however, each of the two coils is only on approximately half of the time, and thus has approximately half of the total current flowing through it. Thus, each coil remains cooler. Further, when the coils are off, they cool somewhat. Finally, the center and outer poles increase the volume of the substrate, which serves to receive heat from the coils and dissipate it. The present invention thus allows for lower operating temperature and greater heat dissipation capability of the head and extends its useful life.

Finally, because the current to the coils 214 and 215 is only turned on and off, and need not reverse direction as in the prior art thin film head 100 of FIG. 1, the impedance of the coils does not create as great an alternating current resistance as that in a single coil, and thus the change of field of the dual coils may not be limited to the speed at which the field can be reversed in a single coil. Thus, the field orientation can possibly be switched at a faster rate than in the prior art.

Figure 4:
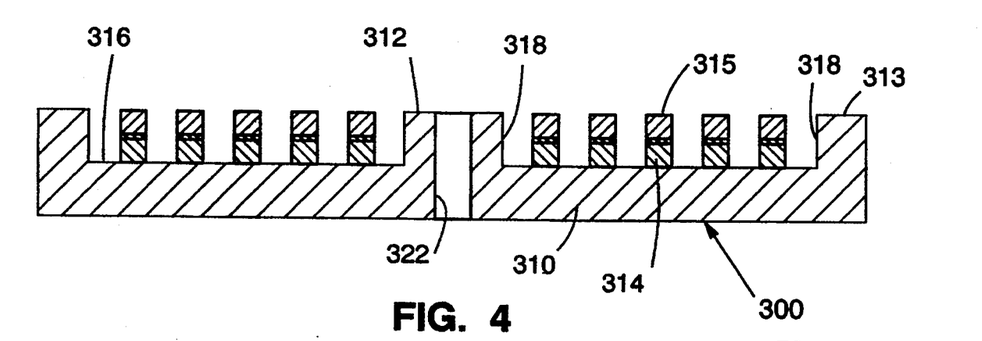
FIG. 4 is a cross sectional view of the thin film dual coil magnetic head of FIG. 2 adapted to allow the laser source to be on the same side of the recording media as the magnetic head.
Figure 5:
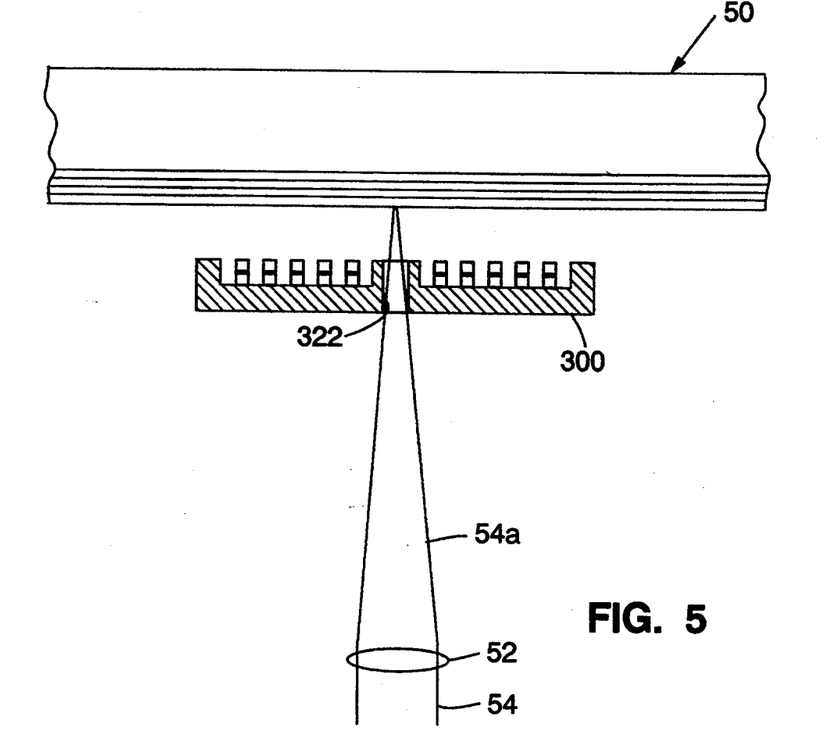
FIG. 5 is a side perspective view of the head of FIG. 4 employed in a recording system where the head and the laser source are on the same side of the recording media.

Referring to FIGS. 4 and 5, an alternative thin-film magnetic head 300 is illustrated for use in a system where head 300, focussing lens 52 and the source of the laser beam 54 are all on the same side of the disk 50. The alternate magnetic head 300 is similar to the head 200 and therefore corresponding reference numbers have been used. However, its center pole 312 has a vertical aperture 322 which also extends through the substrate 310. The aperture 322 permits the focused laser beam 52a to pass through the center of the magnetic head 300 to the recording disk 50 so as to heat the recording layer 51 to the Curie temperature.

Figure 6:
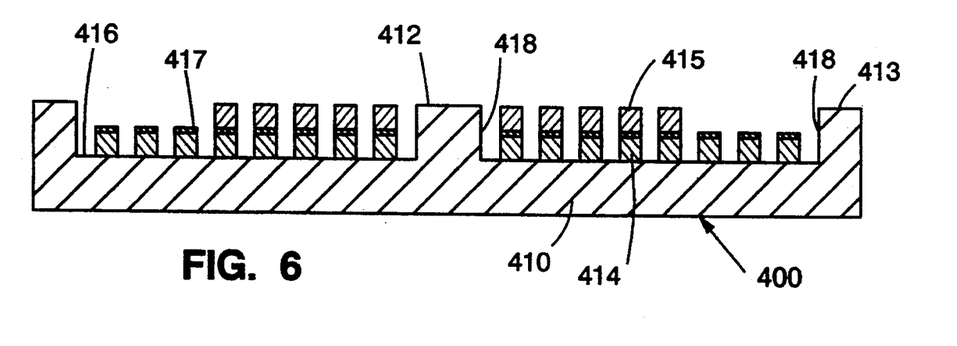
FIG. 6 is a cross-sectional view of another embodiment of the magnetic head of the present invention.
Figure 7:
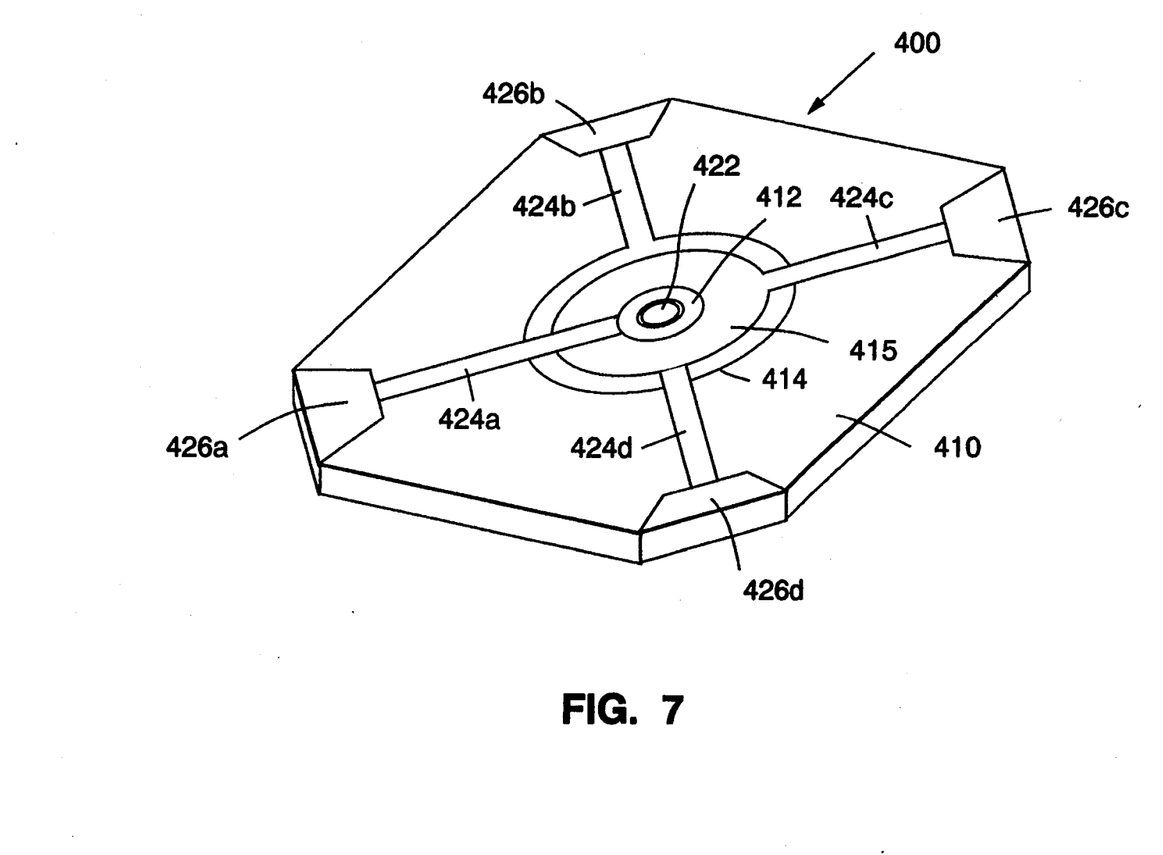
FIG. 7 is a perspective view of the head depicted in FIG. 6.

FIGS. 6 and 7 illustrate another embodiment of the present invention. A dual coil magnetic head 400 is similar to the head 200, and corresponding reference numerals have been given to like parts. The dual coil head 400 can be configured either like the center pole head 200 or the aperture head 300. In this embodiment, however, the lower coil 414 has more windings than the upper coil 415, and thus extends farther radially from the center pole 412. As above, the coils 414 and 415 are separated by an insulating layer 417, as shown in FIG. 6, and are positioned about the center pole 412 within the recess region 416.

The lower coil 414 has more windings so that the field which it generates is greater than that generated by the upper coil 415, for the same amount of current, to compensate for the fact that lower coil 414 is located farther away from recording layer 51 than upper coil 415. As above, in the preferred embodiment, the coils are wound in opposite directions so that the fields of the coils are opposite and either coil may be activated from a single voltage source.

To turn the coils on and off, four thin-film, conducting bus bars 424a–424d are coupled to the coils 414 and 415. The bars are energized by applying a voltage to corresponding conducting pads 426a–426d. In the illustrated embodiment, the bus bars 424a–424d segment the recess 416 into four parts. The bus bar 424a contacts inner winding of both the upper coil 415 and the lower coil 414 and thus connects both coils together. The bus bar 424c contacts the perimeter of the upper coil 415. The bus bar 424b contacts the perimeter of the lower coil 414, and the bus bar 424d contacts an interior winding in the lower coil 414 which is as far from the center pole 412 as the perimeter of upper coil 415.

The coils are turned on and off by applying voltage to the appropriate bus bars. Thus, to turn on the upper coil 415, a voltage is applied to the bus bars 424a and 424c. To turn on the entire lower coil 414, a voltage is applied to the bus bars 424a and 424b. In the event that it is desired to turn only a portion of the lower coil 414 of the same size as upper coil 415, the negative voltage is applied to the bus bars 424a and 424d. By using the bus bar 424d instead of the bus bar 424b, only the center windings of the lower coil 414 are activated and the remainder of the exterior windings ,extending past the point of contact are shorted out.

Figure 8A:
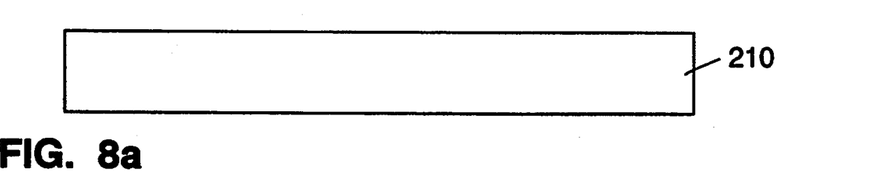
FIGS. 8a–8j are a series of cross-sectional views depicting the steps involved in fabricating the device illustrated in FIG. 2.
Figure 8B:
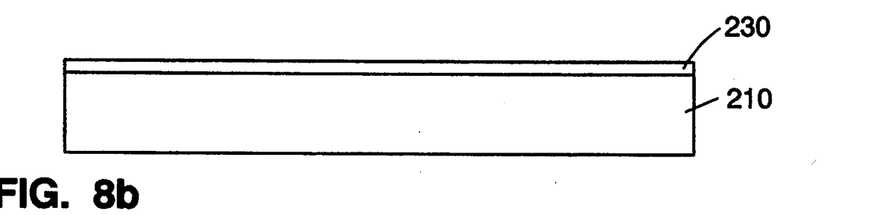
Figure 8C:
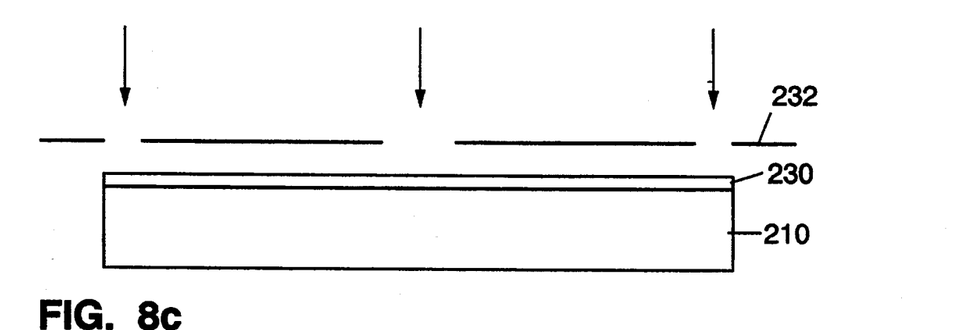
Figure 8D:
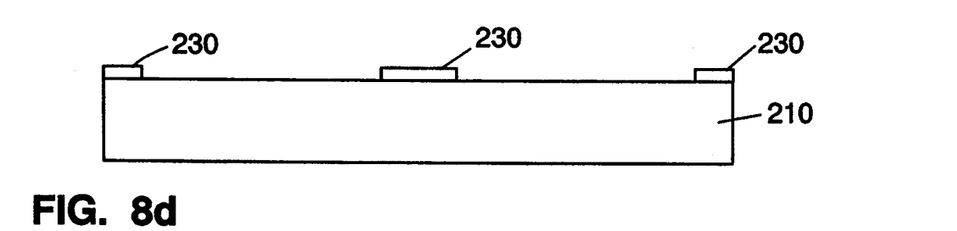
Figure 8E:
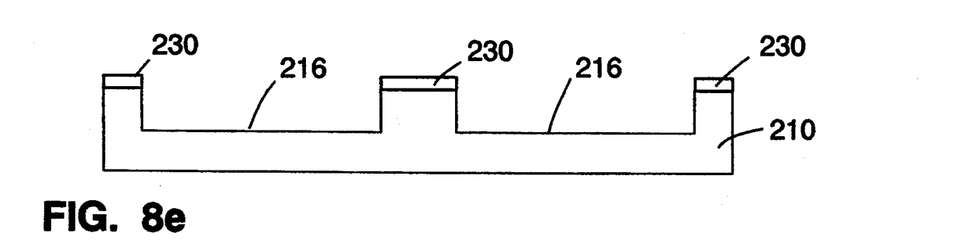
Figure 8F:
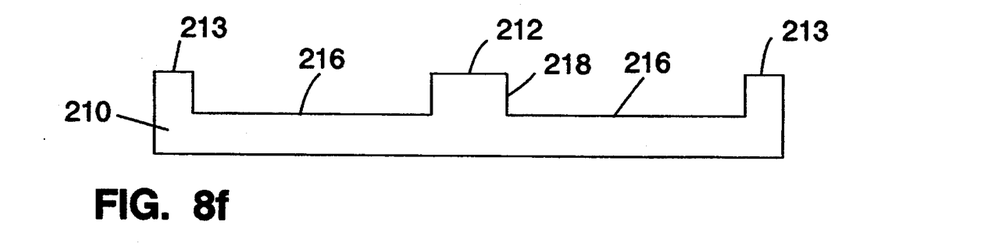

FIGS. 8a–8j show some of the steps involved in fabricating the thin-film magnetic head 200 (similar steps are used to produce the heads 300 and 400) and the lower thin-film coil 214. Referring to FIGS. 8a to 8c, conventional photolithographic techniques are used to apply a layer of photoresist 230 to nickel-zinc substrate 210 (FIG. 8B) and the photoresist 230 is exposed through a pole pattern mask 232, having a pattern corresponding to the pattern of the recess region 216 and center pole 212 (FIG. 8c). The unexposed photoresist 230 is removed (FIG. 8d) and the exposed regions of the substrate 210 are etched a preselected depth to form the recess region 216 (and hence walls 218) in the substrate 210, the interior pole 212, and the ,exterior pole 213 (FIG. 8e). Any remaining photoresist 230 is then removed (FIG. 8f).

Figure 8G:
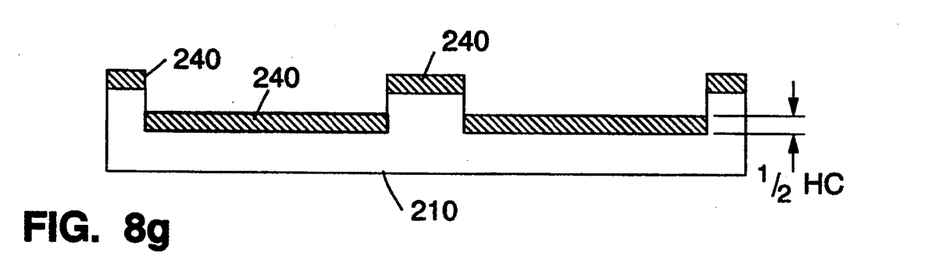
Figure 8H:
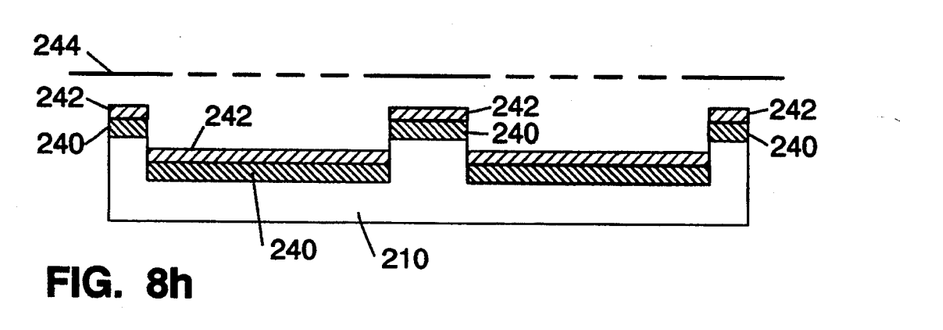
Figure 8I:
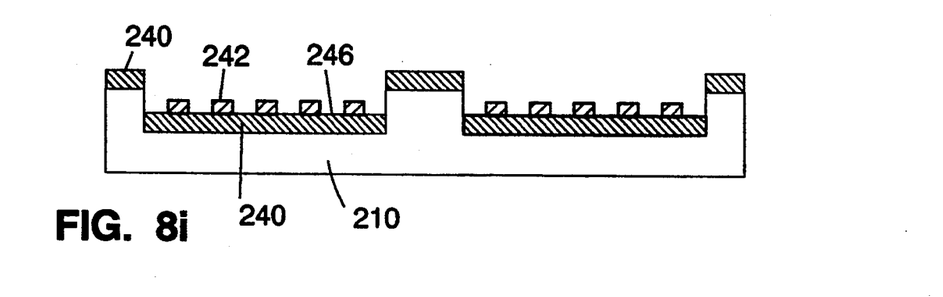
Figure 8J:
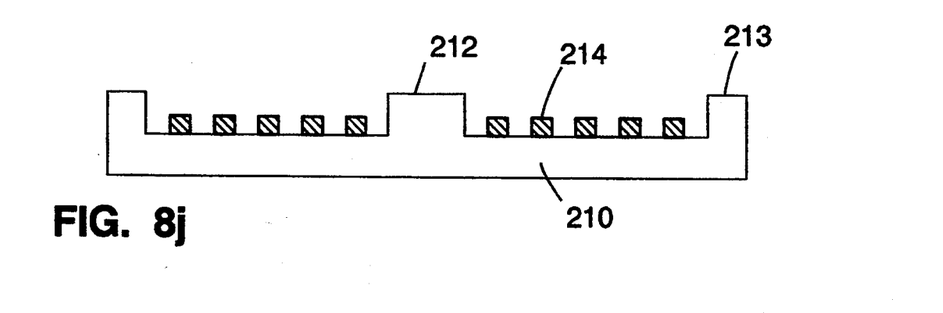

After the interior pole 212, exterior pole 213 and the walls 218 have been formed, a layer of conductive material 240, e.g. copper, having a thickness one-half HC, is deposited on the entire substrate (FIG. 8g). A layer of photo-resist 242 is deposited over the substrate and is exposed through a mask pattern 244 having a pattern corresponding to the spiral "windings" of the coil 214 (FIG. 8h). The exposed areas of the photo-resist layer 242 are etched away to form the openings 246 corresponding to the spaces between the "windings" of the continuous coil 214 (FIG. 8i). The conductive layer 240 is then etched away through the openings 246 to define the coil 214. This also etches away the copper on top of the substrate. The remaining photoresist is then removed, leaving the head in the form shown in FIG. 8j, with the lower coil 214 formed.

An insulating material such as silicon nitride is then deposited over the substrate, forming an insulating layer 217. (While the figures herein show the insulating layer only on the windings of the lower coil 214, when the insulating material is deposited it also to some extent fills in the spaces between the windings. Again, however, the windings are also closer together than is shown herein.) The upper coil 215 is then formed by repeating the process shown in FIGS. 8f to 8j, and results in the magnetic head shown in FIG. 2.

If the magnetic head 400 has more than two coils 214 and 215, the additional coils and the insulating layers between them are formed using photolithographic techniques similar to those described above.

In the embodiment of FIG. 7, in which the coils are of different radii, the bus bars are formed in intermediate steps. For example, the bus bar 424d, used to short out the outer portion of the lower coil 214, is contained within the insulating layer. Thus, a portion of the insulating layer is deposited and a hole cut in the desired spot, the bus bar is created using the same technique as to create the coils, and then the remainder of the insulating layer is deposited, so that the bus bar is insulated from the coils except at the desired connection point. The other bus bars are similarly formed.

It will be appreciated that the above described steps are merely illustrative of one way to fabricate the magneto-optical head according to the invention and that other ways will be apparent to those having ordinary skill in the thin film art.

From the above description, it will be apparent that the invention disclosed herein provides a novel and advantageous thin film magnetic head suitable for use in direct overwriting in magneto-optic disk drives. The foregoing discussion discloses and describes merely exemplary methods and embodiments of the present invention. As will be understood by those familiar with the art, the invention may be embodied in other specific forms without departing from the spirit or essential characteristics thereof. For example, as in the Japanese application mentioned above, the coils nees not be circular, but could be oval or square in shape. Different numbers of coils and windings may be used, or other materials which satisfy the requirements described above. Other photolithographic techniques may also be used if the resulting head structure is as described herein. Accordingly, the disclosure of the present invention is intended to be illustrative, but not limiting, of the scope of the invention, which is set forth in the following claims.

What is claimed is:

1. A thin film magnetic head for magneto-optically recording data on a recording surface of a magneto-optic recording medium, comprising:

a magnetic substrate having a planar surface arranged parallel to the recording surface of the magneto-optic recording medium, the planar surface having an annularly shaped recess therein which defines a center magnetic pole piece extending upward from the planar surface substantially perpendicular thereto and an annularly shaped, coaxial outer magnetic pole piece separated from the center magnetic pole piece by the annularly shaped recess; and a pair of separate thin film, continuous coils of conductive material positioned in the annularly shaped recess, each coil having a plurality of continuous windings positioned coaxially about the center magnetic pole piece, and with one of the coils overlaying the other coil and being separated from the other coil by an insulating material.

2. The thin film magnetic head of claim 1, wherein the depth of the annularly shaped recess is approximately equal to the height of the center magnetic pole piece and the outer magnetic pole piece.

3. The thin film magnetic head of claim 2, wherein the coils have a combined thickness which is about equal to the height of the center magnetic pole piece and the depth of the annularly shaped recess.

4. The thin file magnetic head of claim 1, wherein the magnetic substrate and the center magnetic pole piece have a continuous aperture therethrough.

5. The thin film magnetic head of claim 1, wherein the magnetic substrate is comprised of a ferrite.

6. The thin film magnetic head of claim 5, wherein the magnetic substrate is comprised of a nickel-zinc ferrite.

7. The thin film magnetic head of claim 1, wherein the conductive material of the coils is copper.

8. The thin film magnetic head of claim 1, wherein the pair of coils comprise a first coil, positioned closest to the planar surface, and a second coil which overlays the first coil, and wherein the first coil has more windings than the second coil and a larger radius in order to generate a greater magnetic field than the second coil to compensate for the fact that the first coil is further from the recording surface than the second coil, and further including a plurality of thin film conducting bus bars coupled to the coils to seperately supply power thereto.

9. The thin film magnetic head of claim 1, wherein the thickness of the magnetic substrate in a direction perpendicular to the recording surface is 3 mm.

10. A method for forming a thin film magnetic head for magneto-optically recording data on a magneto-optic recording medium, comprising the steps of:
providing a substrate of magnetic material having a planar surface;
forming an annular groove in the planar surface of the substrate so as to define a central magnetic pole piece and an annular magnetic pole piece coaxial with the central magnetic pole piece on the planar surface, with the central magnetic pole piece and the annular magnetic pole piece extending perpendicular to surface of the substrate and separated from each other by the annular groove; and
photolithographically forming on the planar surface in the groove a first coil of thin film conductive material around the central magnetic pole piece in a continuous spiral path, an insulating layer over the first coil, and a second coil of thin film conductive material around the central magnetic pole piece in a continuous spiral path, overlaying the first coil and being separate from it.

11. The method of claim 10, wherein the depth of the recess, the height of each of the central magnetic pole piece and the annular magnetic pole piece and the combined thicknesses of the first coil and the second coil are formed to be approximately equal.

12. The method of claim 10, wherein the substrate and the central magnetic pole piece and the annular magnetic pole piece are comprised of a ferrite material.

13. The method of claim 10, wherein the conductive material is copper

14. The method of claim 10, wherein the step of forming the central and annular magnetic pole pieces further comprises forming an aperture in the center magnetic pole piece which is perpendicular to the planar surface of the substrate.

* * * * *